(12) United States Patent
Pawellek

(10) Patent No.: US 12,230,777 B2
(45) Date of Patent: Feb. 18, 2025

(54) TEMPERATURE CONTROL DEVICE FOR A BATTERY BANK MODULE

(71) Applicant: NIDEC GPM GmbH, Auengrund OT Merbelsrod (DE)

(72) Inventor: Franz Pawellek, Lautertal (DE)

(73) Assignee: NIDEC GPM GmbH, Auengrund OT Merbelsrod (DE)

( * ) Notice: Subject to any disclaimer, the term of this patent is extended or adjusted under 35 U.S.C. 154(b) by 476 days.

(21) Appl. No.: 17/618,071

(22) PCT Filed: Jul. 1, 2020

(86) PCT No.: PCT/EP2020/068462
§ 371 (c)(1),
(2) Date: Dec. 10, 2021

(87) PCT Pub. No.: WO2021/001402
PCT Pub. Date: Jan. 7, 2021

(65) Prior Publication Data
US 2022/0344747 A1 Oct. 27, 2022

(30) Foreign Application Priority Data
Jul. 4, 2019 (DE) .................... 10 2019 118 094.5

(51) Int. Cl.
*H01M 10/6568* (2014.01)
*F04C 2/16* (2006.01)
(Continued)

(52) U.S. Cl.
CPC .......... *H01M 10/6568* (2015.04); *F04C 2/16* (2013.01); *F04C 15/0065* (2013.01);
(Continued)

(58) Field of Classification Search
CPC ........... H01M 10/6568; H01M 10/613; H01M 10/625; H01M 10/6556; F04C 2/16;
(Continued)

(56) References Cited

U.S. PATENT DOCUMENTS 4,028,025 A * 6/1977 Lonnebring ............ F01C 21/02
277/377
4,547,135 A * 10/1985 Noel ...................... F04C 11/008
417/372
(Continued)

FOREIGN PATENT DOCUMENTS

CN 101145059 A 3/2008
CN 101265900 A 9/2008
(Continued)

OTHER PUBLICATIONS

European Patent Office; Office Action in related European examination proceedings of EP 20 736 314.4 dated Jan. 27, 2023; 5 pages (Machine translation generated Apr. 19, 2023, 3 pages)—8 pages total, European Patent Office, Munich, Germany.
(Continued)

*Primary Examiner* — Charles G Freay
(74) *Attorney, Agent, or Firm* — Wood Herron & Evans LLP

(57) ABSTRACT

The invention relates to a temperature control device for a battery bank module (5). In addition to a temperature control circuit (50), which has a plurality of channels which are in thermal contact with battery cells, and a heat exchanger, the temperature control device also comprises a pump (1). The pump (1) comprises a spindle housing (10) and at least one screw spindle (2a, 2b) which is coupled to a dry-rotor-type electric motor (3).

7 Claims, 1 Drawing Sheet

(51) Int. Cl.
  *F04C 15/00*   (2006.01)
  *H01M 10/613*  (2014.01)
  *H01M 10/625*  (2014.01)
  *H01M 10/6556* (2014.01)

(52) U.S. Cl.
  CPC ......... *F04C 15/008* (2013.01); *H01M 10/613* (2015.04); *H01M 10/625* (2015.04); *H01M 10/6556* (2015.04); *F04C 2240/30* (2013.01); *F04C 2240/40* (2013.01); *H01M 2220/20* (2013.01)

(58) Field of Classification Search
  CPC ................ F04C 15/0065; F04C 15/008; F04C 2240/30; F04C 2240/40
  See application file for complete search history.

(56) References Cited

U.S. PATENT DOCUMENTS

| | | | | |
|---|---|---|---|---|
| 4,623,305 | A * | 11/1986 | Segerstrom | ............. E21B 43/00 417/365 |
| 7,401,655 | B2 * | 7/2008 | Vandevier | ............. E21B 43/121 166/372 |
| 2018/0216614 | A1 | 8/2018 | Hongo et al. | |
| 2018/0287225 | A1 | 10/2018 | Haag et al. | |
| 2019/0017504 | A1 * | 1/2019 | Inoue | ..................... F04C 2/084 |
| 2019/0111862 | A1 | 4/2019 | Dede | |
| 2020/0406784 | A1 * | 12/2020 | Yoshida | ................. B60L 58/26 |
| 2022/0099088 | A1 | 3/2022 | Döhler et al. | |

FOREIGN PATENT DOCUMENTS

| | | | | |
|---|---|---|---|---|
| CN | 102668203 | A | 9/2012 | |
| DE | 4123384 | A1 | 1/1993 | |
| DE | 102013102030 | B3 | 7/2014 | |
| DE | 102015101443 | B3 | 5/2016 | |
| DE | 102017202768 | A1 | 8/2018 | |
| DE | 102017210771 | A1 | 12/2018 | |
| DE | 102017218290 | A1 | 4/2019 | |
| DE | 102018130472 | A1 | 6/2020 | |
| DE | 102019103470 | A1 | 8/2020 | |
| EP | 2765311 | A2 * | 8/2014 | ............. F04C 2/086 |
| WO | 2014138519 | A1 | 9/2014 | |
| WO | 2018163180 | A1 | 9/2018 | |
| WO | 2019101471 | A1 | 5/2019 | |
| WO | 2020164776 | A1 | 8/2020 | |

OTHER PUBLICATIONS

German Patent Office; Examination Report in related German Patent Application No. 10 2019 118 094.5 dated Nov. 4, 2020; 6 pages.

European Patent Office; Search Report in related International Patent Application No. PCT/EP2020/068462 dated Nov. 3, 2020; 4 pages.

The International Bureau of WIPO; International Preliminary Report on Patentability in related International Patent Application No. PCT/EP2020/068462 dated Dec. 28, 2021.

Chinese Patent Office; Examination Report in related Chinese Patent Application No. 202080045627.2, dated Jul. 14, 2024, 19 pages.

* cited by examiner

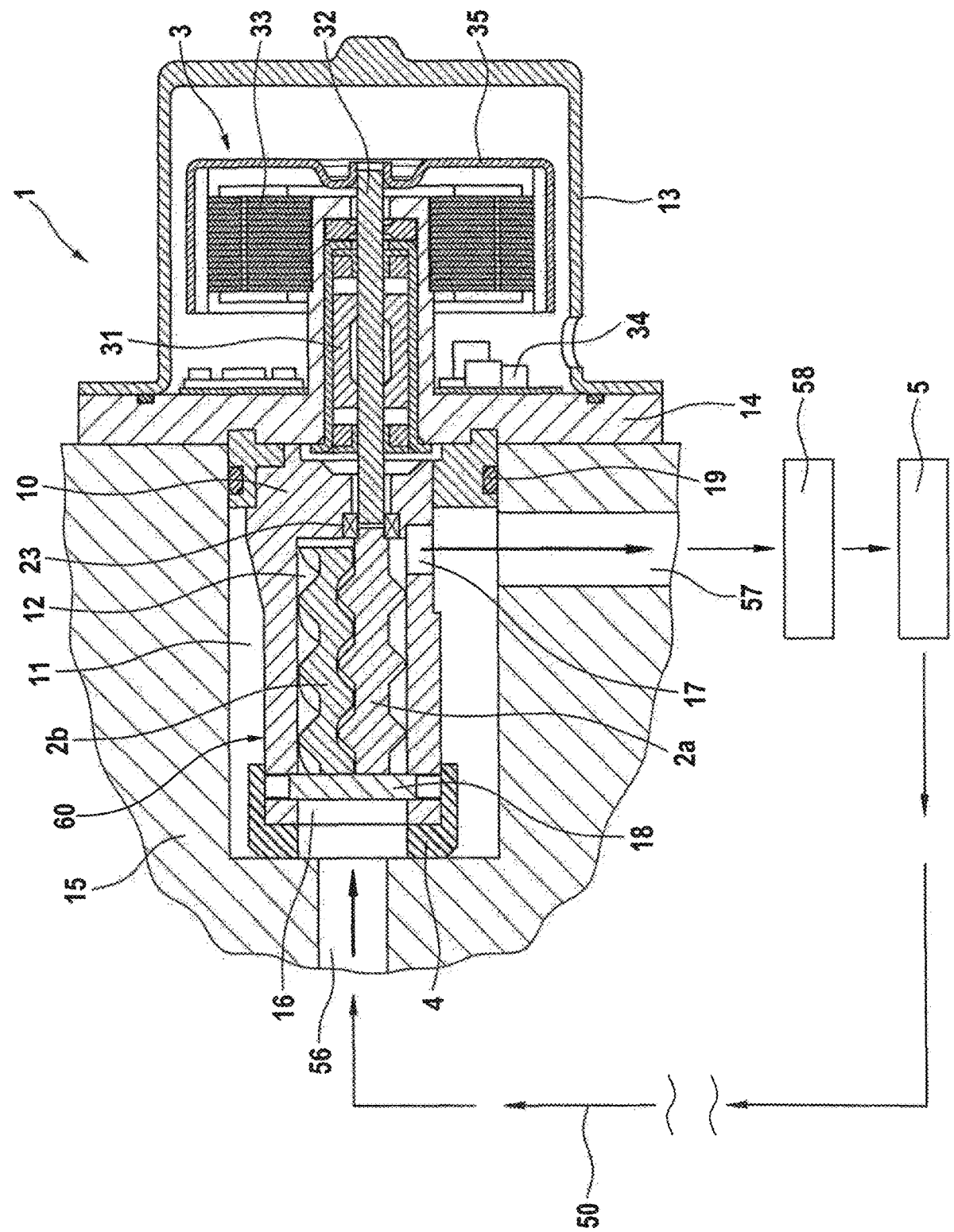

TEMPERATURE CONTROL DEVICE FOR A BATTERY BANK MODULE

The present invention relates to a temperature control device for a battery storage module, e.g. in a traction battery of an electric vehicle.

Temperature control of battery storage modules serves in particular to discharge waste heat, which arises during charging or power drain, by means of a temperature control medium via a heat exchanger.

The cooling circuits of battery-electric vehicles are highly complex, having a multiplicity of line branches, fluid connections and various pumps and valves. Division of the passage cross-section of the whole cooling circuit into line branches, such as networks of cooling channels with correspondingly smaller, possibly capillary, passage cross-sections, requires a substantially higher delivery pressure than in a comparatively large-volume cooling circuit of a combustion engine. Such structures of a branched cooling circuit are produced to an increased degree in the construction of battery storage modules in which a multiplicity of battery cells are cooled through small channels.

An object of the present invention is to provide an alternative technique for controlling the temperature of a battery storage module with a branched temperature control circuit.

A further partial aspect of the object is also to provide a corresponding technical solution such that it can also be inexpensively produced in large numbers by mass production.

The object is achieved in accordance with the invention by a temperature control device having the features of claim 1. The temperature control device for a battery storage module is characterized in particular in that a pump of the temperature control device comprises a spindle housing having an inlet opening and an outlet opening; and at least one screw spindle rotatably accommodated in the spindle housing and coupled to an electric motor; wherein the electric motor is formed as a dry-runner and is arranged in a delimited manner with respect to the spindle housing.

The temperature control device in accordance with the invention permits higher delivery pressures in the temperature control circuit than can be achieved with a centrifugal pump. In comparison to centrifugal pumps, the pump of the temperature control device in accordance with the invention makes available a higher delivery pressure potential for cooling circuits or temperature control circuits with line branches and corresponding constrictions.

In the case of coolant pumps of the centrifugal pump type, an axial gap between an impeller and the pump chamber constitutes the greatest weak point with respect to sealing between the suction side and the pressure side of the pump. Leakage at the axial gap and a corresponding loss of delivery performance increase at higher delivery pressures. The adjustment of a gap dimension effective for sealing purposes depends on the dimensional stability of an axial fit between the impeller and the housing after assembly. When producing centrifugal pumps for higher delivery pressures, the outlay and costs for ensuring a suitable axial sealing gap reach the limits of economic viability. Without this, volumetric efficiency at higher delivery pressures is detrimentally affected.

In the case of a screw spindle mechanism of the temperature control device in accordance with the invention, the effective sealing gap extends over the whole length of the screw spindles between a suction side and a pressure side. It is not necessary to maintain an axial gap dimension since the screw spindles are pressed against a run-up surface on the suction side during operation.

Furthermore, the screw spindle mechanism of the temperature control device in accordance with the invention comprises a smaller acoustically effective surface with respect to the surrounding housing compared to centrifugal pumps. The rotating movement of the blades of an impeller generate rotational speed-dependent pressure fluctuations at chamber walls of the pump chamber, which may be in a resonant frequency range of housing parts.

Alternative types of displacement pumps, such as vane pumps or rotary piston pumps, generate pressure-side pulsations owing to the displacement processes, which give rise to considerable oscillations in the inlet of the temperature control circuit. Irrespective of acoustic frequencies, attempts are made to keep vibrations in battery storage modules as low as possible in order to avoid fatigue damage at numerous contact and solder points of a conductor structure between the individual battery cells.

In contrast, the rotating movement of screw spindles generates a relatively uniform delivery behavior. Accordingly, the pump of the temperature control device in accordance with the invention for a battery storage module ensures a lower level of noise development, in particular in conjunction with a cavity for accommodation of battery cells in the temperature control device.

Although in the prior art, screw pumps are known, they have thus far been used in a different type of construction and application.

Screw pumps comprise a robust rotary piston mechanism which is not sensitive to soiling and which operates without delicate elements, such as stop valves or the like. A volumetric adjustment with respect to a preset rotational speed is not possible. Mechanically driven screw pumps are predominantly known from use in large-scale applications, such as e.g. oil pumps in stationary installations or ships engines, in which they run with relatively constant operating points.

In the area of fuel delivery pumps of vehicles, smaller electrically driven screw pumps have recently become known. The electric drive of such fuel delivery pumps is designed as a wet-running electric motor without a separating can and so both the rotor and the stator are in contact with the fuel.

Thus US 2018/0216614 A1 describes a screw pump which is provided as a fuel pump. A cover with an axial outlet is attached to a housing of the screw pump. The electric motor is received in an outlet chamber of the cover and fuel flows through it before it leaves the outlet.

DE 10 2015 101 443 B3 describes a fuel pump with a housing in which an electric drive motor is coupled to a screw pump. The fuel flows through the drive motor before it leaves the pressure-side outlet.

WO 2014/138519 A1 discloses an electric liquid pump of the screw type. The liquid which flows through an inlet and an outlet also surrounds the motor. A fuel is mentioned as the liquid.

DE 10 2017 210 771 A1 discloses an electrically driven screw pump as a fuel delivery assembly. A pump housing and an electric motor are received in a casing. In the illustrated embodiment, which does not comprise a separating can on the stator of the electric motor, the electric components of the motor are in direct contact with the fuel within an outlet guide on a pressure side of the spindle chamber.

However, the known screw fuel pumps are not transferable to an application as a pump of the temperature control device in accordance with the invention for a battery storage module. In contrast to an oil-based fuel, a water-based temperature control medium or a coolant would corrosively damage the exposed components of the wet-running electric motor, such as e.g. the coil windings of the stator.

For the first time, the invention provides a temperature control device for a battery storage module with a screw spindle mechanism for delivery of a temperature control medium. The invention further provides a dry-running electric motor for driving the spindle mechanism. The temperature control device is suitable for carrying a corrosive temperature control medium.

Advantageous developments of the invention are provided in the dependent claims.

According to one aspect of the invention, a driven screw spindle and an entrained screw spindle can be mounted in a floating manner and axially movable inside the spindle housing by means of a radial clearance fit. In this way, an effective radial sealing gap against leakage between the screw spindles and the spindle housing is automatically produced. An axial sealing gap is formed irrespective of manufacturing tolerances. It is not necessary to maintain an axial gap dimension at the opposing end of the screw spindles. Therefore, cost-effective mass production is considerably facilitated.

According to one aspect of the invention, the temperature control device can also comprise a plug-in connector having an axial degree of freedom, which is arranged between a shaft of the electric motor and the driven screw spindle. By the use of a plug-in connector which at least allows axial clearance, the clearance fit for the floating mounting of the driven screw spindle is impaired as little as possible. Furthermore, an interface for the coupling of a shaft of different electric motors is produced and renders possible a modular drive concept for the temperature control device.

According to one aspect of the invention, the temperature control device can also comprise an accommodation housing which comprises an opened cavity and a feeder line as well as a return line of the temperature control circuit, which open into the opened cavity. Thus, the spindle housing can be inserted from an axial end to a housing flange into the opened cavity, and the temperature control circuit can be connected to the inlet opening and the outlet opening of the spindle housing.

This formation provides constructional integration between a pump-side housing and a housing part of the temperature control device. Therefore, hose connections or fluid couplings at an interface between the pump and a feed and return of the temperature control circuit can be dispensed with and corresponding installation space for them in the temperature control device can be saved.

The opened cavity of the accommodation housing which surrounds the spindle housing is used as an outlet chamber of the pump. During construction of the accommodation housing of the temperature control device, a degree of freedom of 360° is therefore available with respect to a radial arrangement of the return line to the pump. Therefore, an arrangement can be selected which is optimized to the smallest possible installation space.

On one side, the pump has a pump head 60 which can be inserted into a cavity and is in the shape of the spindle housing, and on the other side, has a motor housing located outside the cavity. Use of electric motors with different dimensions is rendered possible in spite of the integrated construction.

According to one aspect of the invention, a housing flange, which is arranged between the spindle housing and the motor housing, can comprise a bearing seat, extending towards the side of the motor housing, for a shaft bearing. This formation renders possible the use of a single shaft bearing and contributes to achieving compact axial dimensions for the pump in the temperature control device.

According to one aspect of the invention, the spindle housing can be delimited in the area of the inlet opening by a feather key inserted through a radial assembly gap. The mounting and insertion of the screw spindles is simplified by formation of a feather key which can be formed in a simplified manner as a bearing shield with an inlet opening.

According to one aspect of the invention, a shaft of the electric motor can be mounted by means of a shaft bearing with a sliding bearing bushing, and the sliding bearing bushing can be surrounded by a sealed filling of lubricant. This formation makes it possible for the bearing of the shaft to be compact and long-lasting. The sealed lubrication of the sliding bearing bushing resists any washing out or settling by a temperature control medium. In contrast to oil-based media to be delivered, such as lubrication oils or fuels, the contact between the sliding bearing and a temperature control medium can have detrimental effect on the sliding properties of the shaft bearing. Furthermore, the sealed filling of lubricant, together with the sliding bearing gap of the sliding bearing bushing, ensures a particular sealing function. A good and long-lasting sealing function is highly relevant to service life of the pump and operating safety of the battery storage module of which the temperature is to be controlled, in particular in the case of operation at higher delivery pressures on the one hand and the use of a dry-running electric motor on the other.

According to one aspect of the invention, power electronics can be arranged inside the motor housing in thermal contact with the housing flange. The housing flange is in contact and in a heat-exchange relationship with the spindle housing and the accommodation housing, through which the temperature control medium of the temperature control circuit flows. The arrangement of the power electronics in thermal contact with the housing flange provides an effective structure for diverting waste heat from the power electronics of the electric motor.

The invention will be described hereinafter with the aid of an embodiment and with reference to the accompanying drawing, FIG. 1 shows a schematic illustration of the temperature control circuit and a cross-sectional view of a screw spindle mechanism of a temperature control device for a battery storage module according to one embodiment of the invention, The term "temperature control circuit" is to be understood, in the sense of this disclosure, to be a delivery circuit for a temperature control medium. The medium to be delivered can be a water-based coolant which contains additives, such as glycol or another anti-freeze agent. The manner of operation of the temperature control circuit is not limited to a cooling function. Thus, the temperature control circuit can also provide a heating function using a heat source e.g. in a start-up phase of a system or when the ambient temperature is low.

The terms "feeder line" and "return line" of the temperature control circuit relate to how the battery storage module of which the temperature is to be controlled is viewed. Consequently, the feeder line of the temperature control circuit is connected to the outlet opening of the pump and the return line of the temperature control circuit is connected to the inlet opening of the pump.

In a temperature control circuit, a plurality of battery storage modules can be connected with a flow passing through them in parallel or in succession. Furthermore, a temperature control circuit can connect a plurality of temperature control devices and a plurality of pumps.

The term "temperature control source (58)" relates in the sense of this disclosure to an atmosphere or convective air flow of the system environment, to a cold source with a coolant or a heat source, such as an electric heating element. The corresponding temperature control sources (58) are in thermal contact with the temperature control medium in the temperature control circuit via a heat exchanger, such as a radiator with ribs or the like.

In the sense of this disclosure, the term "screw pump" is understood to mean skew rotary piston pumps with a thread pitch for displacement of a medium to be delivered. Such types of pump generally comprise a driven screw spindle and at least one further screw spindle which is entrained therewith via engagement of the toothing.

In the case of the temperature control device which is shown in FIG. 1, a pump 1 is arranged in an integrated manner within a temperature control circuit 50. The temperature control circuit 50 serves to control the temperature of a battery storage module 5, in particular to discharge waste heat, which arises during charging or power drain, by means of a temperature control medium—delivered by the pump 1—via a heat exchanger, not shown. In the following application, the battery storage module 5, not shown in more detail, is a traction battery for a battery-electric vehicle. The temperature control circuit 50 comprises a plurality of channels with a small cross-section which are in thermal contact with a multiplicity of battery cells of the battery storage module 5.

In the embodiment of the schematic illustration of FIG. 1, in a spindle housing 10 of the pump 1, a driven screw spindle 2a and an entrained screw spindle 2b are received in a rotatable manner in a spindle chamber 12 of the spindle housing 10. A cross-sectional contour of the spindle chamber 12 is formed by two bores in the spindle housing 10, with overlapping radii, in order to ensure engagement of the screw spindles 2a, 2b. An open side of the spindle chamber 12 is delimited by a feather key 18. The feather key 18 is formed flat as an end-surface chamber wall of the spindle chamber 12 and has an inlet opening 16 of the spindle housing 10. The feather key 18 is inserted into the spindle housing 10 through a mounting slot perpendicularly to the screw spindles 2a, 2b.

The screw spindles 2a, 2b are mounted in a floating manner by a radial clearance fit with respect to the cross-sectional contour of the spindle chamber 12 and by an axial clearance fit of the spindle chamber 12. During pump operation, the spindles are pressed against the feather key 18 by the displacement process. The feather key 18 serves as a bearing shield with respect to the axial sliding bearing of the end surfaces of the screw spindles 2a, 2b.

A pressure side of the spindle chamber 12, which communicates with an outlet opening 17 of the spindle housing 10, is located on the drive side of the screw spindles 2a, 2b, which is depicted on the right. A suction side of the spindle chamber 12 is located on the other side of the screw spindles 2a, 2b on which the feather key 18 is disposed. The suction side of the spindle chamber 12 communicates with the inlet opening 17 of the spindle housing 10.

The spindle housing 10 forms, with the screw spindles 2a, 2b, an insertable pump head 60 which is inserted into an accommodation housing 15 of the temperature control device from an axial end of the spindle housing 10, towards which the inlet opening 16 is directed, up to a housing flange 14 which is connected to the opposing axial end of the spindle housing 10. The accommodation housing 15 is an integral component of the temperature control device, of the pump 1 and of the temperature control circuit 50. The accommodation housing 15 can also be an integral component of a module housing of the battery storage module 5, in which the temperature control circuit 50 is continued in the form of integrated channels.

The accommodation housing 15 comprises an opened cavity 11 which receives the spindle housing 10 up to the housing flange 14. A return line 56 and a feeder line 57 of the temperature control circuit 50 open into the cavity 11. The feeder line 57 opens into a peripheral surface of the cavity 11. The cavity 11 surrounds the spindle housing 10 in such a way than an annular part of the cavity 11 is exposed where it overlaps with the outlet opening 17 and the mouth of the feeder line 57. The exposed part of the cavity 11 produces a pressure-side connection between the spindle housing 10 and the temperature control circuit 50.

The return line 56 opens into an end-face base surface of the opened cavity 11 and is allocated, in an opposing arrangement, to the inlet mouth 16 at the axial end of the inserted spindle housing 10. A sealing element 4 surrounds the mouth of the return line 56 and the inlet mouth 16 so that a suction-side connection is produced between the temperature control circuit 50 and the spindle housing 10. The sealing element 4 further surrounds a periphery of the spindle housing 10 in the area of the assembly slot, through which the feather key 18 is introduced. Therefore, a possible leakage flow along a plug-in fit of the feather key 18 is sealed. In the exposed cavity 11, a sealing ring 19 is introduced into groove-like radial free space upstream of the housing flange 14 in order to seal the pressure side of the pump 1 to the outside.

The driven screw spindle 2a is connected to an electric motor 3. On the pressure side of the spindle chamber 12, the spindle housing 10 comprises an aperture for a shaft 32 which is driven by the electric motor 3. A motor housing 13, in which the electric motor 3 is arranged, is connected on the opposing side of the housing flange 14. An internal stator 33 of the electric motor 3 is located on a collar portion of the housing flange 14. An external pot-shaped rotor 35 surrounds the stator 33 and is connected to one end of the shaft 32. A bearing seat for a shaft bearing 31 is formed internally on the collar portion of the housing flange 14. The shaft bearing 31 is a sliding bearing which is sealed at both axial ends and is filled with a lubricant. The other end of the shaft 32 is coupled to the driven screw spindle 2a by means of a plug-in connector 23 which allows axial clearance.

The motor housing 13 comprises a separated motor chamber, in which the dry-running electric motor 3 and an electronic system, in particular power electronics 34 for switching the electric power at the electric motor 3, are received. The stator 33 comprises field coils which are actuated by the power electronics 34 and supplied with electric power. The stator 33 is in thermal contact with the peripheral surface of the collar portion of the housing flange 14. Thus, waste heat from the field coils of the stator 33 is diverted via the housing flange 14 to the accommodation housing 15 and the spindle housing 10 and is absorbed by the temperature control circuit passing therethrough. The power electronics 34 are likewise in thermal contact with the end surface of the housing flange 14 in order to discharge waste heat from the electronic components into an area of the temperature control circuit, through which a flow passes.

The temperature control device is considered hereunder in a delivery direction of the temperature control circuit 50 in order to control the temperature of the battery storage module 5. A liquid medium to be delivered is sucked into the spindle chamber 12 from the return line 56 of the temperature control circuit 50 through the seal 4 and the inlet opening 16 of the spindle housing 10 on the suction side. A rotational movement of engaged screw profiles of the rotating screw spindles 2a, 2b generates a negative pressure on the suction side of the spindle chamber 12 and a positive pressure on the opposing pressure side of the spindle chamber 12. The temperature control medium is delivered by continuous displacement along a screw pitch of the engaged screw profiles and ejected from the spindle chamber 12 through the outlet opening 17 of the spindle housing 10. Downstream of the outlet opening 17, the temperature control medium flows via the cavity 11 into the feeder line 57 of the temperature control circuit 50 and to the battery storage module 5.

Thereafter, the temperature control medium in the battery storage module 5 flows through a branching arrangement of channels of the temperature control circuit 50, which are formed in the accommodation housing 15 of the temperature control device and are in thermal contact with the battery cells of the battery storage module 5. The temperature control medium then flows through a heat exchanger and discharges waste heat, which was absorbed by the battery cells of the battery storage module 5, to a cooler medium, such as e.g. the ambient air, and is sucked back into the pump 1. A flow can also pass through the battery storage module 5 and the heat exchanger in the temperature control circuit 50 in the reverse order. Furthermore, the temperature control device 50 can additionally have a further temperature control source 58, such as a heating element, through which the temperature control circuit 50 passes.

LIST OF REFERENCE NUMERALS

1 Pump
2a Driven screw spindle
2b Entrained screw spindle
3 Electric motor
4 Seal
5 Battery storage module
10 Spindle housing
11 Cavity
12 Spindle chamber
13 Motor housing
14 Housing flange
15 Accommodation housing
16 Inlet opening of the spindle housing
17 Outlet opening of the spindle housing
18 Feather key
19 Sealing ring
23 Plug-in connector
31 Shaft bearing
32 Shaft
33 Stator
34 Power electronics
35 Rotor
50 Temperature control circuit
56 Return line of the temperature control circuit
57 Feeder line of the temperature control circuit

The invention claimed is:

1. A temperature control device for a battery storage module comprising:
a temperature control circuit configured to control a temperature of a plurality of battery cells in the battery storage module;
wherein the temperature control circuit carries a temperature control medium and includes a plurality of channels that are in thermal contact with the battery cells, the temperature control medium being in thermal contact with a temperature control source;
characterized in that
a pump for conveying the temperature control medium includes:
a spindle housing having an inlet opening and an outlet opening; and
at least one screw spindle rotatably accommodated inside the spindle housing and coupled to an electric motor;
wherein the electric motor is formed as a dry-running motor and is arranged so as to be separated from the spindle housing,
wherein an accommodation housing includes an opened cavity and a feeder line as well as a return line of the temperature control circuit, wherein the feeder line and the return line open into the opened cavity,
wherein the spindle housing is configured to be inserted into the opened cavity from an axial end of the spindle housing up to a housing flange, wherein the temperature control circuit is configured to connect to the inlet opening and the outlet opening of the spindle housing,
wherein the pump has a pump head that is formed by the spindle housing and the at least one screw spindle, wherein the pump head is configured to be inserted into the opened cavity,
wherein the feeder line opens into a peripheral surface of the opened cavity of the accommodation housing, wherein the return line opens into an end-face base surface of the opened cavity of the accommodation housing, and wherein a sealing element is located between the end-face base surface and the axial end of the spindle housing and surrounds the return line and the inlet opening.

2. The temperature control device according to claim 1, wherein a driven screw spindle and an entrained screw spindle are mounted in a spindle chamber of the spindle housing such that the driven screw spindle and the entrained screw spindle are axially movable inside the spindle chamber by means of a radial clearance fit.

3. The temperature control device according to claim 2, furthermore comprising a plug-in connector having an axial degree of freedom arranged between a shaft of the electric motor and the driven screw spindle.

4. The temperature control device according to claim 1, wherein
the housing flange is arranged between the spindle housing and a motor housing, the housing flange comprising a shaft bearing with a bearing seat.

5. The temperature control device according to claim 1, wherein
the inlet opening of the spindle housing is configured to receive a feather key inserted through a radial assembly gap.

6. The temperature control device according to claim 1, wherein
a shaft of the electric motor is mounted in a shaft bearing with a sliding bearing bushing, and wherein the sliding bearing bushing is surrounded by lubricant.

7. The temperature control device according to claim 1, wherein
power electronics are arranged inside a motor housing in thermal contact with the housing flange, the housing flange in contact with the spindle housing.

* * * * *